(12) United States Patent
Wollnik et al.

(10) Patent No.: US 8,800,048 B2
(45) Date of Patent: Aug. 5, 2014

(54) SOFTWARE PROTECTION THROUGH INTERDEPENDENT PARAMETER CLOUD CONSTRAINED SOFTWARE EXECUTION

(75) Inventors: Matthias Wollnik, Seattle, WA (US); Nathan Ide, Bothell, WA (US); Andrey Lelikov, Bellevue, WA (US); John Richard McDowell, Seattle, WA (US); Aaron Payne Goldsmid, New York, NY (US); Karan Singh Dhillon, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1530 days.

(21) Appl. No.: 12/123,471

(22) Filed: May 20, 2008

(65) Prior Publication Data

US 2009/0293041 A1    Nov. 26, 2009

(51) Int. Cl.
*G06F 21/00* (2013.01)
*G06F 21/14* (2013.01)
*G06F 21/12* (2013.01)

(52) U.S. Cl.
CPC .............. *G06F 21/14* (2013.01); *G06F 21/125* (2013.01)
USPC ................................ 726/26; 726/30; 713/189

(58) Field of Classification Search
CPC ............................... G06F 21/14; G06F 21/125
USPC ......................................................... 726/26
See application file for complete search history.

(56) References Cited

U.S. PATENT DOCUMENTS

| | | | |
|---|---|---|---|
| 6,463,538 B1 | 10/2002 | Elteto | |
| 6,668,325 B1 | 12/2003 | Collberg et al. | |
| 7,263,606 B2 | 8/2007 | Elteto | |
| 7,287,166 B1 | 10/2007 | Chang et al. | |
| 8,312,297 B2 * | 11/2012 | Sato et al. | 713/194 |
| 2003/0028789 A1 | 2/2003 | Cuenod et al. | |
| 2004/0039921 A1 * | 2/2004 | Chuang | 713/187 |
| 2004/0139340 A1 | 7/2004 | Johnson et al. | |

(Continued)

FOREIGN PATENT DOCUMENTS

WO    2007126341 A2    11/2007

OTHER PUBLICATIONS

Collberg et al., "A Taxonomy of Obfuscating Transformations", 1997, pp. 1-36.*

(Continued)

*Primary Examiner* — Mohammad L Rahman
*Assistant Examiner* — Thaddeus Plecha
(74) *Attorney, Agent, or Firm* — Tony Azure; Raghu Chinagidabha; Mickey Minhas

(57) ABSTRACT

Methods and a tool or instrument for performing the methods of protecting a computer program with a parameter cloud are disclosed. A parameter cloud comprising a plurality of elements may be created. Called functions of a computer program may have defined expected parameter cloud states so that proper behavior of the called function is achieved when the parameter cloud state is the expected parameter cloud state. An expected parameter cloud state may include a selected set of elements of the parameter cloud having assigned values. Static portions of the called functions may depend on a current parameter cloud state, and calling functions may transform the parameter cloud state prior to calling their respective called functions. The methods and instrument may operate on original source code or post-binary targets of the computer program. A fingerprint may be used to identify a specific computer program from a sequence of state transitions.

19 Claims, 6 Drawing Sheets

(56) References Cited

U.S. PATENT DOCUMENTS

| | | |
|---|---|---|
| 2005/0166191 A1* | 7/2005 | Kandanchatha et al. ..... 717/137 |
| 2005/0198526 A1* | 9/2005 | Marr et al. .................... 713/200 |
| 2006/0195906 A1 | 8/2006 | Jin et al. |
| 2007/0266434 A1 | 11/2007 | Reifer |
| 2008/0022102 A1 | 1/2008 | Venkatesan et al. |
| 2008/0208560 A1* | 8/2008 | Johnson et al. ................. 703/22 |
| 2010/0251378 A1* | 9/2010 | Eker et al. ....................... 726/26 |

OTHER PUBLICATIONS

Wang et al., "Software Tamper Resistance: Obstructing Static Analysis of Programs", 2000, pp. 1-18.

Madou, et al., "Software Protection through Dynamic Code Mutation", 2005, pp. 371-385.

Kanzaki, et al., "A Software Protection Method Based on Instruction Camouflage", Electronics and Communications in Japan, Part 3, vol. 89, No. 1, 2006, pp. 47-59.

* cited by examiner

SOFTWARE PROTECTION THROUGH INTERDEPENDENT PARAMETER CLOUD CONSTRAINED SOFTWARE EXECUTION

BACKGROUND

Software and computer programs frequently come under attack by malicious parties who attempt to gain unauthorized access to source code by reverse engineering. Such malicious parties may include pirating communities, malware authors, viruses, and even competitors of the software owner or author, to name a few. Reverse engineering of software or a computer program may result in the owning company or author losing intellectual property, being susceptible to probing for application vulnerabilities, and ultimately suffering the loss of revenue and market share.

Owning companies and authors of software continually search for ways to mitigate the risks that may result from these attacks, such as finding new defensive techniques. One commonly used reverse engineering approach used by attackers is the static analysis of individual functions, such as statically analyzing a binary by focusing on a single function. Preventing or decreasing the ease of and/or increasing the cost and time for performing static analysis of individual functions to help protect the rights, rightful ownership and benefits thereof would benefit the owners and authors of software and computer programs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present application discloses methods for protecting a computer program or software using a parameter cloud. Embodiments of the methods may operate on and modify source code of the computer program or a post-compile target of the computer program.

A parameter cloud may have a plurality of elements, with each element having a value. The values of the elements may change over time. An expected state of the parameter cloud may be defined a priori for each called function to be protected. The expected state may include a subset or set of the plurality of elements with each element having an assigned value. A calling function may be modified to transform the state of the parameter cloud into the state expected by the called function prior to calling the called function. In this manner, the proper, expected behavior of the called function may depend on successful completion of all of the functions or code that executed before the called function.

Furthermore, the computer program or software may be modified so that the called function derives a portion or all of its static data from a current state of the parameter cloud. If the current state of the parameter cloud is equivalent to the expected state of the parameter cloud for the called function, then the called function may have the anticipated, correct values for its static data and may behave in an appropriate manner, i.e., as indicated by the original source code. If, however, the current state of the parameter cloud is not equivalent to the expected state, then the called function may behave in an unexpected manner, thus thwarting a possible intended attack.

The present application also discloses a tool or instrument for performing embodiments of the methods for protecting a computer program with a parameter cloud. Additionally, the present application discloses a fingerprint of a computer program for identification based on a generated sequence of states of the parameter cloud during the execution of the computer program.

DRAWINGS

FIG. 1 illustrates a block diagram of an exemplary computing system that may operate in accordance with the claims;

FIG. 2 an exemplary, basic embodiment of protection of a computer program with a parameter cloud;

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
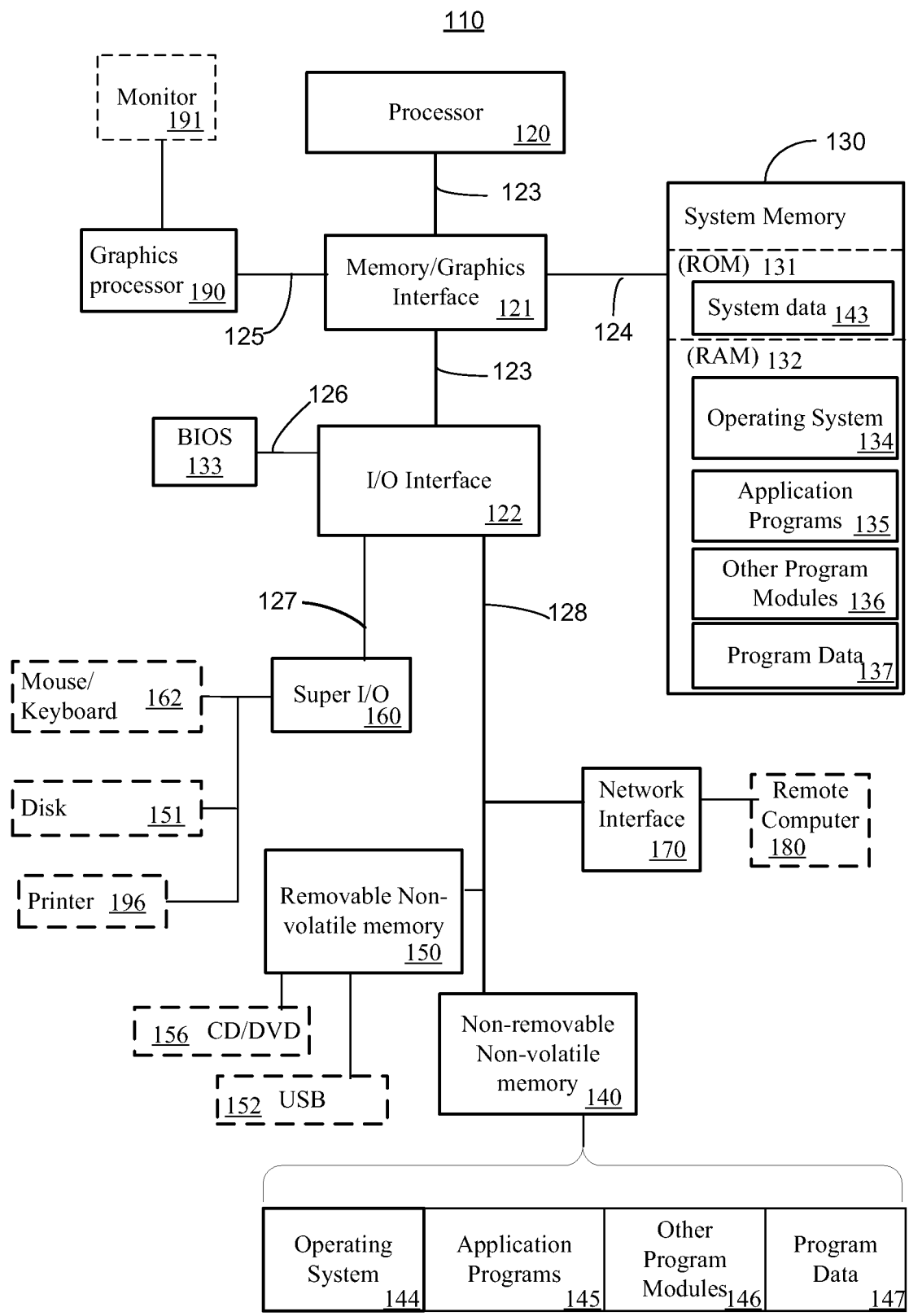

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as read/writeable disk 151, keyboard/mouse 162, and printer 196, as examples. The super I/O chip 160 may be connected to the I/O interface 121 with a low pin count (LPC) bus, in some embodiments. The super I/O chip 160 is widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. Removable media, such as a universal serial bus (USB) memory 152 or CD/DVD drive 156 may be connected to the PCI bus 128 directly or through an interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processing unit 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet.

In some embodiments, the network interface may use a modem (not depicted) when a broadband connection is not available or is not used. It will be appreciated that the network connection shown is exemplary and other means of establishing a communications link between the computers may be used.

Figure 2:
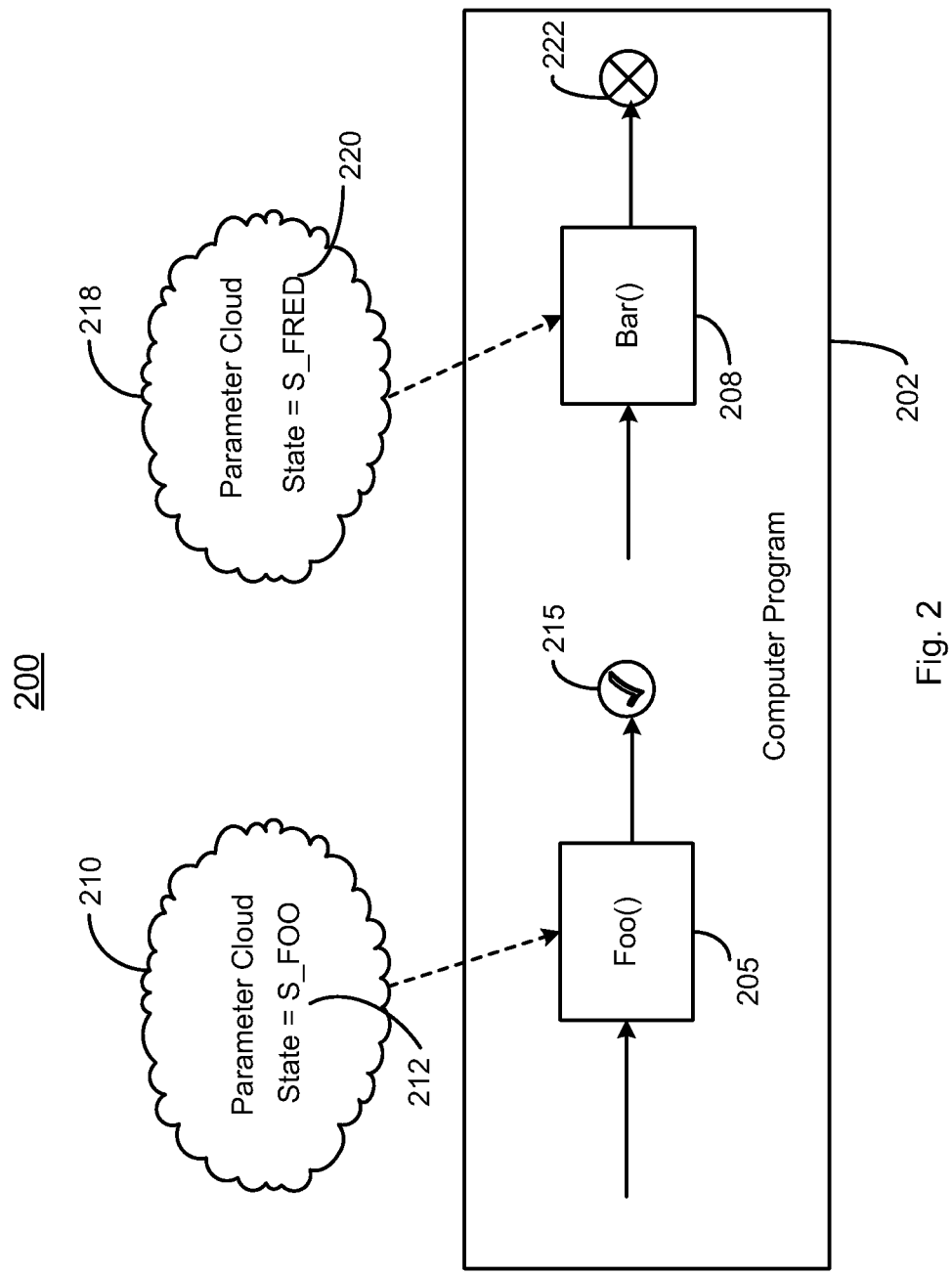

FIG. 2 illustrates a basic, illustrative embodiment 200 of the present disclosure of protecting a computer program 202 by using a parameter cloud. Computer program 202 may include of computer-executable instructions stored in, for instance, system memory 130, removable non-volatile memory 150 or non-removable non-volatile memory 140 of computer 110 illustrated in FIG. 1. A computer program 202 may have a function Foo() 205 and another function Bar() 208. One of ordinary skill in the art will understand that computer program 202 is not limited to only two functions and may have any number of functions. One of ordinary skill in the art will also understand that although functions Foo() 205 and Bar() 208 are depicted without any arguments for the sake of simplicity, Foo() 205 and Bar() 208 may or may not have arguments. Function Foo() 205 may be protected by parameter cloud 210 and may use a parameter cloud 210 to derive static portions of its program. Parameter cloud 210 may include a state 212 and a plurality of elements (not pictured in FIG. 2, but illustrated in a later Figure).

Function Foo() 205 may require parameter cloud 210 to be in an expected state 212 (in this example, "S_FOO") in order for Foo() 205 to execute correctly, i.e., behave as indicated by the original source code of Foo() 's author. If parameter cloud 210 is in the state expected by Foo() 205 ("S_FOO" in this example) when Foo() 205 executes, Foo() may behave in an expected or desired manner 215.

At some point after Foo() 205 has finished execution, function Bar() 208 of computer program 202 may execute. At the time of Bar() 's execution, parameter cloud 210 may have shifted to a new state 220, in this example "S_FRED" 220 shown in parameter cloud 218. Parameter cloud 218 and parameter cloud 210 are the same entity, however their depictions and corresponding reference numbers 210, 218 are different to indicate different temporal instances of the same parameter cloud. Function Bar() 208 may require parameter cloud 218 to be in an expected state of "S_BAR" in order for Bar() 208 to execute correctly. In this example, however, the value of state 220 is "S_FRED" and not the expected state "S_BAR," so Bar() may not behave as expected 222. The unexpected state 220 may occur, for instance, if an attacker embedded subversive instructions or data into the computer program for malicious purposes. Thus, protection of a computer program 202, or the correct or expected behavior of functions 205, 208 of a computer program 202 may be tied to the state 212, 220 of a shifting parameter cloud 210, 218.

Figure 3:
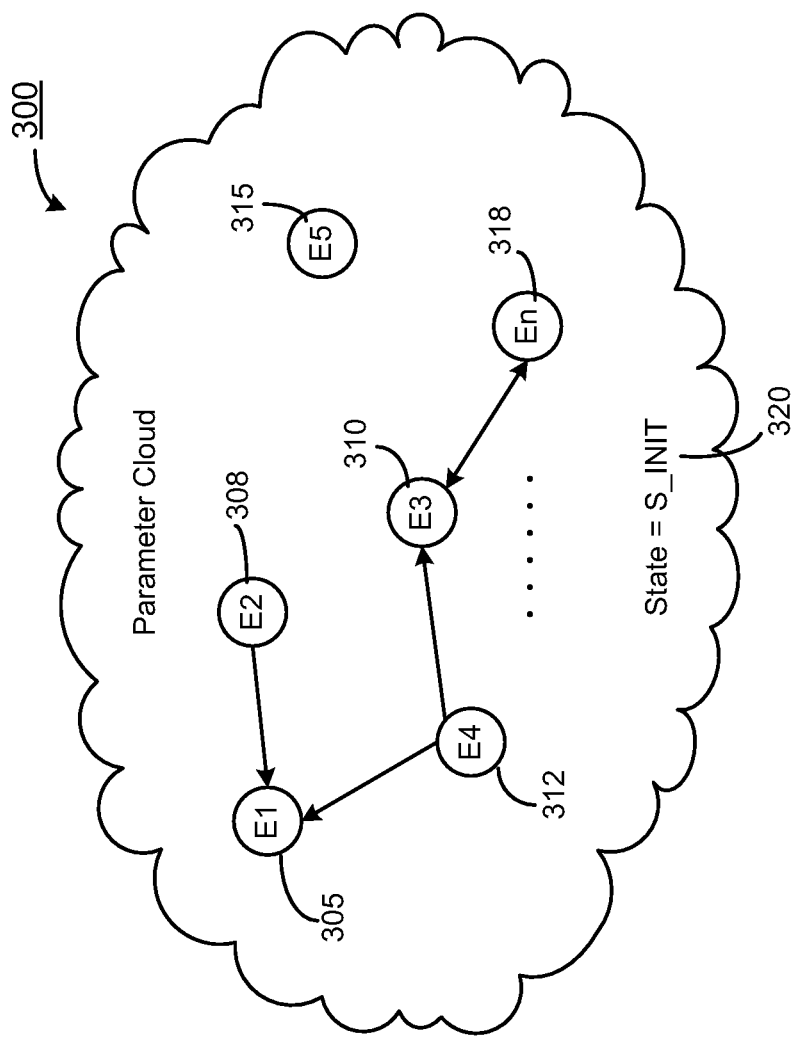
FIG. 3 illustrates an exemplary embodiment of a parameter cloud.

FIG. 3 illustrates an exemplary embodiment of a parameter cloud 300, such as parameter cloud 210, 218 illustrated FIG. 2. Parameter cloud 300 may have a plurality of elements E1, E2, E3, E4, E5 . . . En, represented by references 305, 308, 310, 312, 315 and 318 respectively. Parameter cloud 300 may have an arbitrary number of elements and complexity. An embodiment of parameter cloud 300 may have a multiplicity of elements 305, 308, 310, 312, 315, 318 in order to increase the difficulty of reverse engineering by a rogue party. Different elements 305, 308, 310, 312, 315, 318 within the cloud may be interdependent, as illustrated by the dependency arrows in FIG. 3.

At any point in time, each of the elements 305, 308, 310, 312, 315, 318 of parameter cloud 300 may have a value. The value may change over time. Each function that is to be protected by parameter cloud 300 may have a state 320 of parameter cloud 300 that is pre-defined to be an expected state 320 for the function. In the example illustrated by FIG. 2, function Foo() 205 has a pre-defined expected state of "S_FOO" and function Bar() 208 has a pre-defined expected state of "S_BAR." Upon execution of a function, if the current state 320 is equivalent to the expected state 320 of the function, the function may execute in a correct, desired manner, i.e., as intended by the author of the function.

The pre-definition of the expected state 320 for a function may be arbitrary. The expected state 320 may be a group of elements from the plurality of elements 305, 308, 310, 312, 315, 318 of the parameter cloud 300 with each member of the group having an assigned value. The group of elements may include every element of the plurality of elements or a subset of the plurality of elements. The group of elements may be randomly selected, and the defined value for each member of the selected group may also be randomly assigned. For instance, in the example illustrated by FIG. 2, Foo() 205 may expect a state of "S_FOO" 212 in order for Foo() 205 to execute as desired. Expected state "S_FOO" 212 may have been pre-defined to be, for example, element E1 (reference 305) having the value 30,463, element E5 (reference 315) having the value −38, and element En (reference 318) having the value 46.089. When Foo() 205 executes, if the value of element E1 (reference 305)=30,463, the value of element E5 (reference 315)=−38, and the value of element En (reference 318)=46.089, then Foo() 205 may behave in an expected or desired manner, i.e., as designed by the author of Foo() 205.

Continuing with applying the embodiment of parameter cloud 300 in FIG. 3 to the example illustrated in FIG. 2, function Bar() 208 may expect a state of "S_BAR" in order for Bar() 208 to behave correctly. Expected state "S_BAR" may have been pre-defined to be, for example, element E2 (reference 308) having the value 56 and element En (reference 318) having the value −0.0849. In FIG. 2, however, when Bar() 208 executes, the parameter cloud state 220 is not "S_BAR" but "S_FRED." "S_FRED" may have been randomly defined to include a different group of elements in parameter cloud 300 with a different group of assigned values that is not equivalent to "S_BAR." So, when function Bar() 208 interacts with parameter cloud 300 having state "S_FRED" 220, elements E2 (reference 308) and En (reference 318) may have values other than the pre-assigned expected values for "S_BAR," e.g., the pre-assigned expected value of element E2 (reference 308)=56 and the pre-assigned expected value of element En (reference 318)=−0.0849. Bar() 208 may then execute in an unexpected manner (reference 222), possibly signifying that Bar() 208 or other portions of computer program 202 have been compromised.

Parameter cloud 300 is depicted in FIG. 3 has having a state of S_INIT 320. A state 320 of a parameter cloud 300 may be initialized to a "zero-state" value (as represented symbolically by "S_INIT" in FIG. 3). A thread, as commonly known by one of ordinary skill in the art, may be a part of a computer program that can execute independently of other parts of the computer program. A thread in a computer system (such as computer system 110 of FIG. 1) that intends to execute a part of or all of a computer program (such as computer program 202 of FIG. 2) may initialize parameter cloud 300 to a pre-defined initial state 320, or pre-defined "zero-state" value, such as depicted by the zero-state value of "S_INIT." "S_INIT", like other pre-defined expected states for other functions, may be a randomly selected group of elements from the plurality of elements 305, 308, 310, 312, 315, 318 in parameter cloud 300, each with a randomly assigned value. The selected group of elements may include, for example, predetermined static data, an indication of an allocated value, an indication of a value within a run-time image of the computer program, compile-time data or run-time data. Thus, the reader will appreciate that in one embodiment, "S_INIT" may be the expected state of the first function called by the thread.

Alternatively or additionally, a non-thread entity that may not intend to execute computer program 202 may initialize the state 320 to the zero-state "S_INIT." Said entities may include, for example, an initialization routine, an audit function, or other types of entities within computer system 110. Each entity (e.g., thread or non-thread) that performs initialization of the parameter cloud 300 may initialize the parameter cloud 300 to a different pre-defined zero-state.

Figure 4:
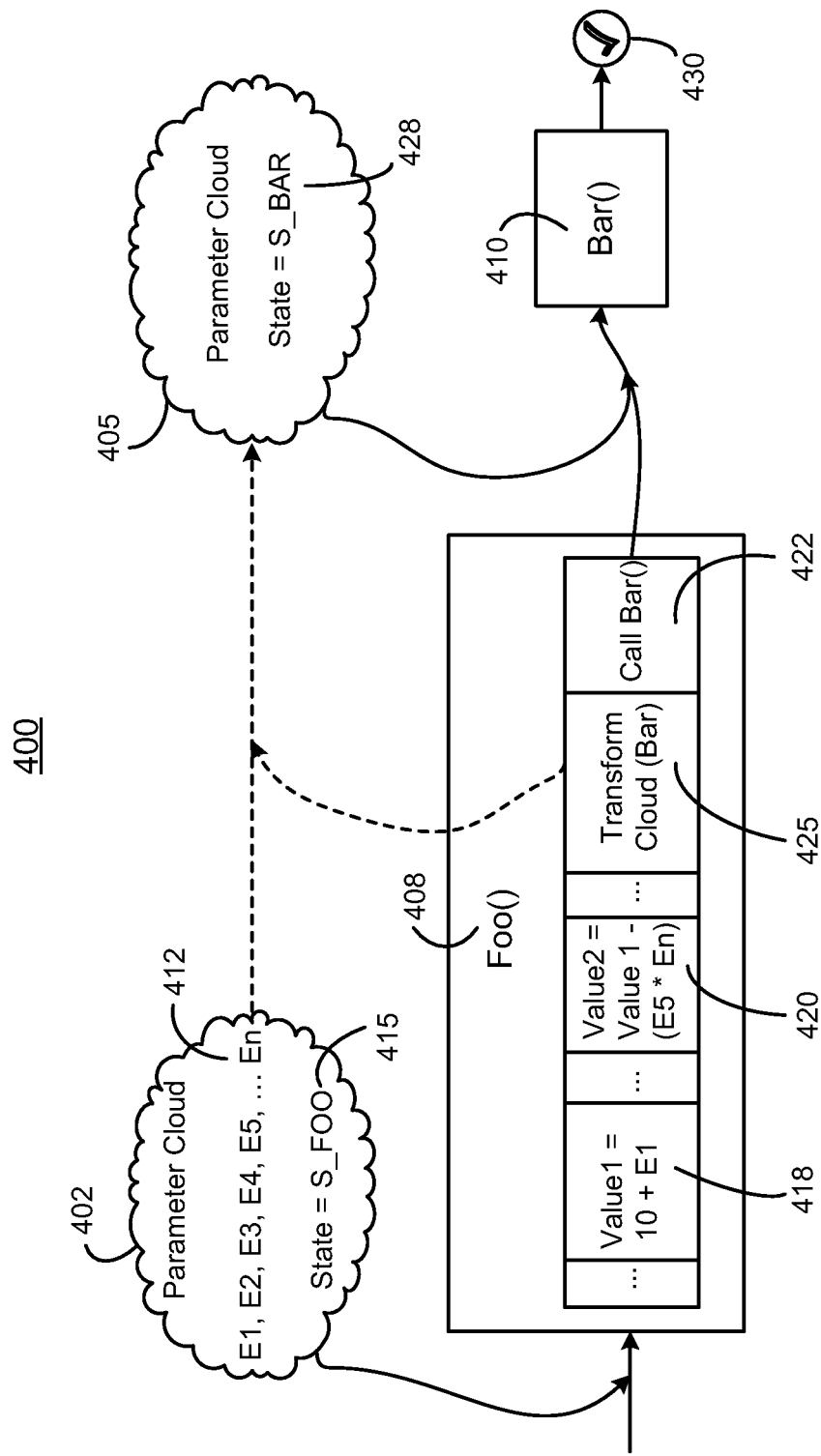
FIG. 4 illustrates a detailed embodiment of protecting a computer program using a parameter cloud.

FIG. 4 illustrates a more detailed, exemplary embodiment 400 of the protecting a computer program using a parameter cloud 402, 405. Similar to FIG. 2, parameter cloud 402 and parameter cloud 405 are the same entity, but the different reference numbers 402, 405 denote different instances in time of the same parameter cloud. In this example 400, functions Foo() 408 and Bar() 410 are functions called by a computer program (not pictured), and function Foo() 408 may call function Bar() 410. Both Foo() 408 and Bar() 410 may be protected by the same parameter cloud 402, 405. Parameter cloud 402, 405 may take the form of parameter cloud 300 illustrated in FIG. 3, and have a plurality of elements E1, E2, E3, E4, E5, . . . En (reference 412).

In this example 400, when Foo() 408 begins execution, parameter cloud state 415 may be "S_FOO," i.e., the state expected by Foo() 408. Since the current state 415 of parameter cloud 402 matches Foo() 's pre-defined expected state, Foo() 408 may execute as desired according to the intent of Foo() 's author, that is, according to the logic of the original source code of Foo() 408.

The static portions of Foo() 408 may be derived from values of one or more elements of the state "S_FOO" 415 of parameter cloud 402. In general, one or more static portions of a function may be derived, determined or have a dependency on one or more elements of its protecting parameter cloud. In one embodiment, the static portions of the function may depend from the group of elements selected for the pre-defined expected state of the parameter cloud for the function.

The static portions of a function may include but are not limited to constant data, an offset in an allocated heap memory, an offset within a loaded image, other compile time values, other run-time values, and/or pointers or indications to values. Recall that for function Foo() 408 in the previous Figures, state "S_FOO" 415 was (illustratively) pre-defined to be element E1 having the value 30,463, element E5 having the value −38, and element En having the value 46.089. Reference 418 illustrates static data "Value1" of Foo() 408 as dependent on a single element E1 of parameter cloud 402. Reference 420 illustrates static data "Value2" of Foo( ) 408 as having a more complex dependency on both Value1 and two elements E5 and En of parameter cloud 402. Thus, one of ordinary skill in the art will appreciate that when the parameter cloud 402 is in an expected state 415 for a function 408, the function 408 may derive one or more portions of its static data 418, 420 from the expected values of the elements 412, and therefore, allow the function 408 to behave in a desired or correct manner.

Of course, derivations of static portions of Foo() 408 and other protected functions are not limited to these simple dependency examples and may be more complex. Derivations, dependencies and/or determinations of one or more static portions 418, 420 of a function 408 based on parameter cloud state 415 may be nested, sub-nested and/or combined. Derivations 418, 420 may involve multiple elements 412 and may include multiple operations on the values of elements 412. Any derivation, determination or dependency of one or more static portions 418, 420 of a function 408 using some or all elements 412 of a state 415 of the function 408 may operate in accordance with the present disclosure.

Continuing with the embodiment 400, function Foo() 408 may call function Bar() 410 as indicated by reference 422. Prior to calling Bar() (reference 422), Foo() 408 may transform parameter cloud 402 according to the expectations of Bar() 410, as indicated by reference 425. Using the example of the previous Figures, expected state "S_BAR" for function Bar() 410 may have element E2 having the value 56 and element En having the value −0.0849. To transform or shift the parameter cloud 402 (reference 425), Foo() 408 may set the value of element E2 to 56 and the value of element En to −0.0849. Thus, the shifted parameter cloud 405 may have the state S_BAR 428. When Bar() 410 executes, the current parameter cloud state 428 may be equivalent to Bar() 's expected parameter cloud state "S_BAR", so Bar() 410 may behave as expected or desired 430, e.g., according to the intent of Bar() 's author or according to the logic of the original source code of Bar() 410. Similar to Foo() 408, Bar() 410 may also derive or determine some or all of its static portion from the current parameter cloud state 428. If the current parameter cloud state is equivalent to Bar() 's expected parameter cloud state, then the static portions may derive correctly. If the current parameter cloud state does not match Bar() 's expected parameter cloud state, the static portions may be derived resulting in unexpected values and unexpected behavior of Bar() 410. Also similar to Foo() 408, if Bar() 410 has another function that it calls (not shown), before calling that function, Bar() 410 may shift or transform the current parameter cloud 405 to have the parameter cloud state expected by that function.

Figure 5:
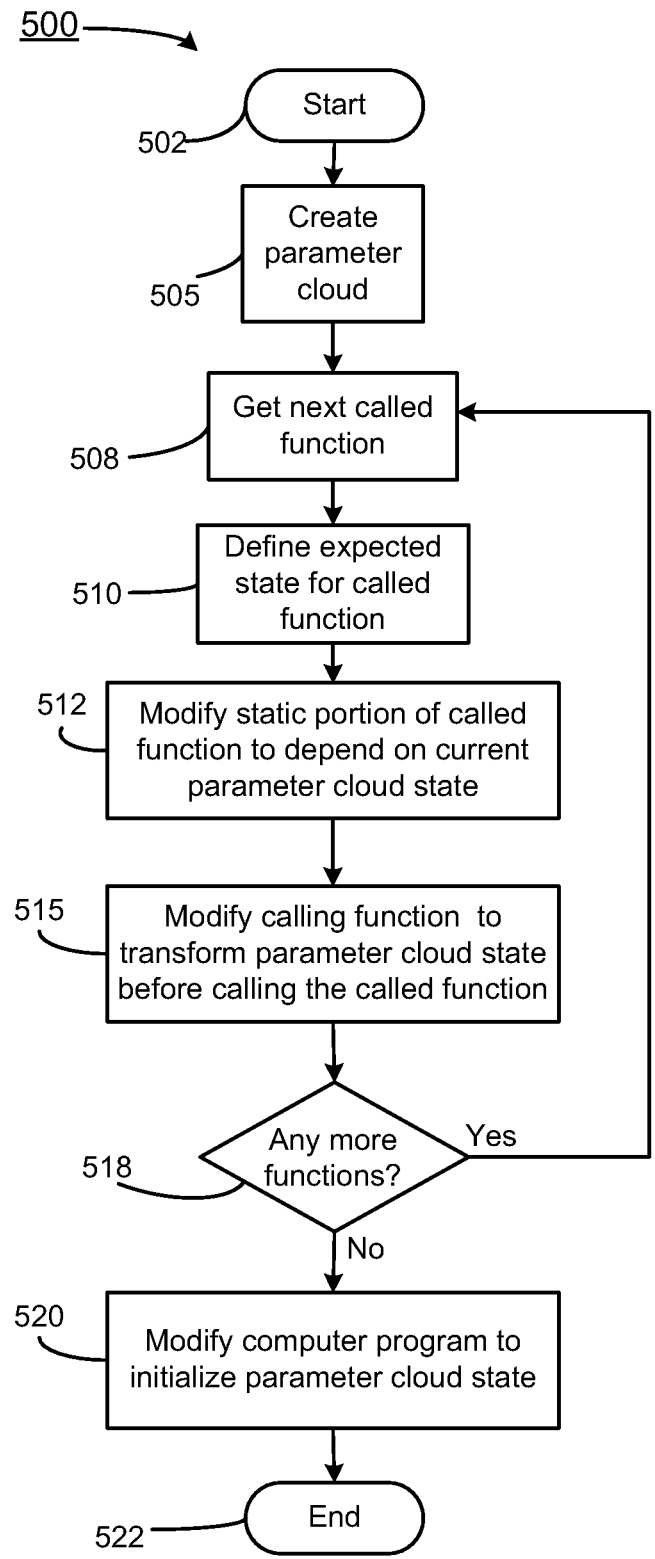
FIG. 5 illustrates an exemplary method of protecting a computer program using a parameter cloud.

FIG. 5 depicts an exemplary method 500 of protecting a computer program using a parameter cloud. Method 500 may be used in accordance with the embodiments of FIGS. 1, 2, 3 and 4. At the start 502, a parameter cloud may be created 505. The created parameter cloud may have a plurality of elements. Each of the plurality of elements may have a value at any given time, and the value of each element may change over time. Next, at block 508, a called function of the computer program may be identified by method 500. An expected state of the parameter cloud for the identified called function may be defined (block 510). The expected state may include a selected set of some or all of the plurality of elements of the parameter cloud. The set may be selected in any number of ways, including by user input, randomly, by a given algorithm, other ways or combination of ways. The expected state of the parameter cloud for the identified called function may include an assigned value for each member of the selected set of elements. Like the selected set of elements, each assigned value may be assigned in any number of ways, including by using user input, randomly, by a given algorithm, other ways or combination of ways.

At block 512, the called function may be modified so that one or more static portions of the called function depend on the set of selected elements of the parameter cloud. Thus, at run-time, the values of the one or more static portions of the called function may be determined or derived based on the current values of one or more elements from the set of selected elements of the expected state for the function defined in block 510. A static portion of the called function may include, for instance, one or more constant data values, one or more offsets in allocated heap memory, one or more offsets within a loaded image, a compile time value, a run-time value, other static values, pointers or indications to values, or some combination of the aforementioned types of static information used by the called function. Different parts of the static portion of the called function may be derived using different combinations of elements from the set of selected elements of the expected parameter cloud state. Different parts of the static portion of the function may be derived using different operations on current values of elements from the set of selected elements of the parameter cloud.

At block 515, a calling function that calls the called function may be modified so that the calling function transforms the state of the parameter cloud into the expected state of the called function prior to calling the called function. The parameter cloud may be entirely transformed, that is, each and every one of the plurality of elements of the parameter cloud may be given a new value during transformation even if the expected state of the called function is not defined to depend on each and every one of the plurality of elements. In another embodiment, the parameter cloud may only be partially transformed, where only elements in a subset of the plurality of elements are given new values.

At block 518, a determination is made if there are any more called functions in the computer program to which method 500 may be applied. In an exemplary embodiment, each and every called function of the computer program may be identified to be operated on by method 500 in order to provide a high level of protection to the computer program. Another embodiment, however, may have a subset of the functions of computer program operated on by method 500 to provide protection. If there are more functions as determined at block 518, method 500 returns to block 508 to get the next function to be protected.

If there are no more functions to be protected as determined at block 518, the computer program may be modified to initialize the parameter cloud state to a zero-state or other initialization state (block 520). For instance, one embodiment may modify each thread that calls one or more of the protected called functions to initialize the parameter cloud to a zero-state or known starting state (block 520). In another embodiment, other non-thread entities such as initialization, audit or other entities may initialize the parameter cloud state 520 to the same or different starting state. In some embodiments, both thread and non-thread entities may be modified (block 520), and in some embodiments of method 500, block 520 may be omitted altogether.

In one embodiment, method 500 may be implemented by operating on the original source code of the computer program. In another embodiment, method 500 may be implemented by operating on a post-compiled target of the computer program. In yet another embodiment, method 500 may be implemented by combinations of operating on both a portion of the source code and a portion of the post-compiled target.

Figure 6:
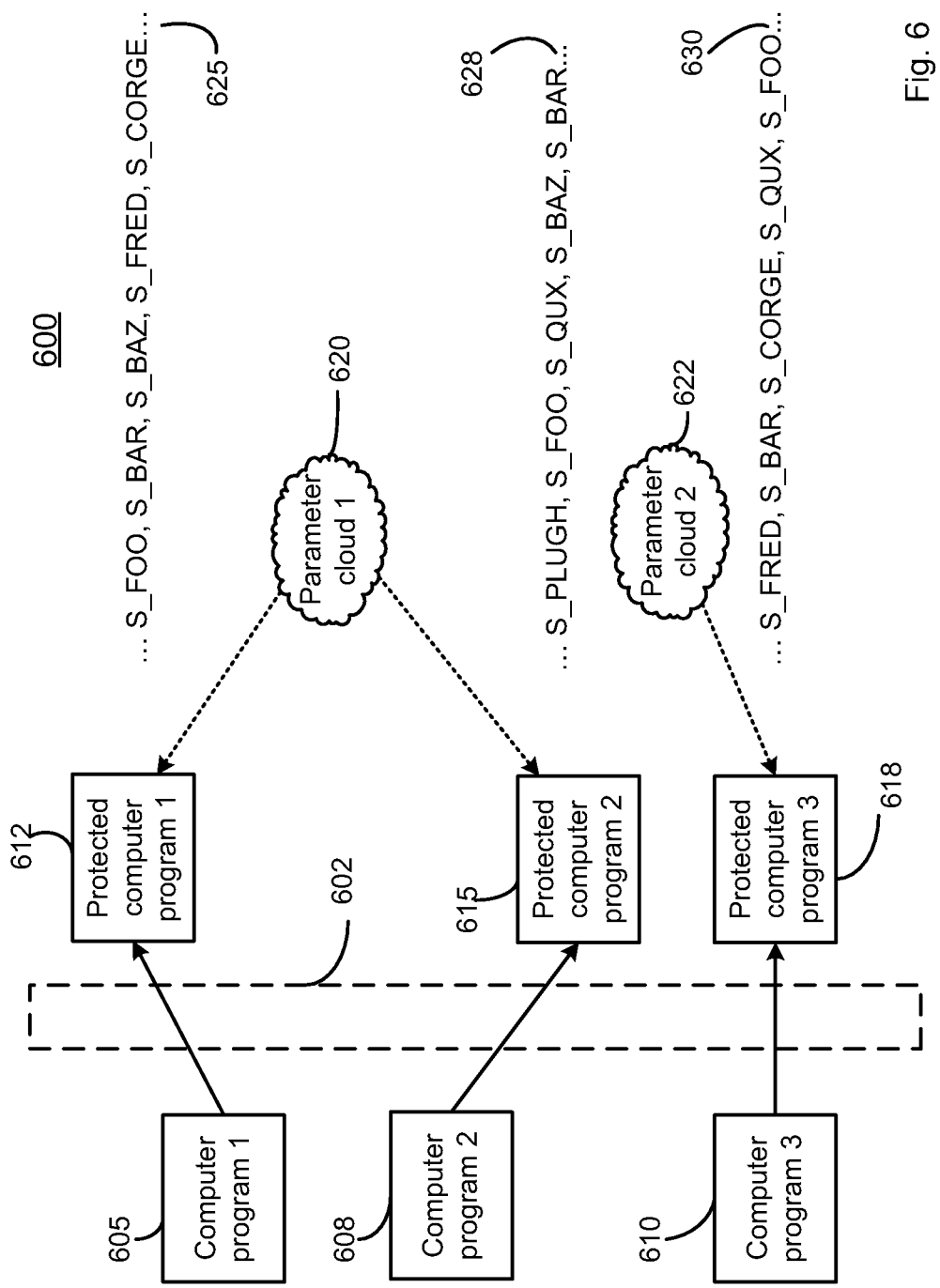
FIG. 6 illustrates an embodiment of the use of an exemplary instrument or tool for protecting a computer program using a parameter cloud, and fingerprinting a computer program.

FIG. 6 illustrates an embodiment of the use of an exemplary instrument or tool for protecting a computer program using a parameter cloud, and the fingerprint of a computer programs protected by the parameter cloud. In this embodiment 600, the dashed block indicated by reference 602 represents the instrument or tool for protecting a computer program using a parameter cloud. The instrument or tool 602 may automatically perform an embodiment of method 500 shown in FIG. 5, and may operate in accordance with embodiments of FIGS. 1, 2, 3, and 4. The instrument or tool 602 may include computer-executable instructions stored on a computer-readable storage medium, such as references 130, 140, and/or 150 of FIG. 1. The instrument or tool 602 may or may not include a user interface to facilitate configuration of and display output from the tool 602.

In FIG. 6, computer programs 1, 2 and 3 (references 605, 608 and 610, respectively) each are computer programs to which instrument 602 is applied. Computer programs 1, 2 and 3 (605, 608, 610) may be in an original source code form, computer programs 1, 2 and 3 (605, 608, 610) may be in a post-compiled target form such as a binary form or other form, or some portion of computer programs 1, 2, and 3 (605, 608, 610) may be in an original source code form and another portion in a post-compiled target form. After the tool or instrument 602 operates on computer programs 1, 2 and 3 (605, 608, 610), protected versions of computer programs 1, 2 and 3 may result, as indicated by references 612, 615 and 618, respectively. The protected versions may have therein called and calling functions that are modified in accordance with, for example, blocks 510, 512 and 515 of method 500, where called functions may have defined expected parameter cloud states, static portions of the called functions may depend on a current parameter cloud state, and calling functions may transform the parameter cloud state prior to calling their respective called functions. As previously discussed, for maximum protection of a computer program using embodiments of the present disclosure, all called functions within the computer program and their associated calling functions may be operated on by tool 602. In some embodiments, only a subset of all calling functions and their associated calling functions may be operated on by instrument 602.

Additionally, the tool or instrument 602 may create one or more distinct parameter clouds 620 622. Different computer programs may be protected by different parameter clouds. In the illustration of FIG. 6, protected computer program 1 (reference 612) and protected computer program 2 (reference 615) are shown as both being protected by parameter cloud 1 (reference 620). Using a same parameter cloud 620 for protection of more than one computer program may occur, for instance, in a scenario when protected computer program 1 (reference 612) and protected computer program 2 (reference 615) are executed by the same thread. Protected computer program 3 (reference 618) is shown as being protected by parameter cloud 2 (reference 622) and may not share the protection of parameter cloud 2 (reference 622) with other computer programs.

Although FIG. 6 depicts the inputs to tool or instrument 602 as being computer programs (612, 615, 618), in another embodiment these inputs may be different functions or groups of functions within a single computer program. Thus, different functions or groups of functions within a single computer program may be protected by the same parameter cloud 620 or a different parameter cloud 622. In yet another embodiment, a first computer program and combinations of functions within a second computer program may share a parameter cloud 620. Other permutations of parameter cloud protection sharing may be possible.

A protected computer program may have a known ordered sequence of function calls based on the original source code of the computer program. As previously discussed, for a function protected by a parameter cloud, an expected state of the parameter cloud for the function may be pre-determined or pre-defined (such as performed in block 510 of FIG. 5). As each function may have a different, defined expected state, an expected sequence of parameter cloud states (i.e., a fingerprint of the computer program) may be generated during a correct execution of a computer program based on the sequence of function execution. An actual sequence of parameter cloud states that occurs during the run-time execution of a computer program may monitored and compared to known fingerprints of computer programs to determine or identify the specific computer program that is running.

FIG. 6 illustrates examples of fingerprints as follows: an example of a fingerprint for computer program 1 (reference 612) is shown as the expected sequence of parameter cloud states " . . . S_FOO, S_BAR, S_BAZ, S_FRED, S_CORGE . . . " (reference 625) with each state corresponding to the expected parameter cloud state of a different function. In other words, the fingerprint of computer program 1 (reference 612) may be the expected sequence of parameter cloud states corresponding to the known sequence of functions that execute in computer program 1 (reference 625). Similarly, in this scenario 600, the known sequence of functions that execute in computer program 2 (reference 615) may have a fingerprint or corresponding expected parameter cloud state sequence of " . . . S_PLUGH, S_FOO, S_QUX, S_BAZ, S_BAR . . . " (reference 628), and computer program 3 (reference 618) may have a fingerprint or corresponding expected state sequence of " . . . S_FRED, S_BAR, S_CORGE, S_QUX, S_FOO . . . " (reference 630). Thus, a generated sequence of parameter cloud states may be examined and compared to known fingerprints to assist in identifying the specific computer program that produced the sequence of actual parameter cloud state transitions.

A fingerprint 625, 628, 630 may correspond to the sequence of parameter cloud states when a computer program is executing correctly or is executing per the intent of its original source code. Due to this characteristic of fingerprints, a trace or output may be examined to pinpoint potential compromised code locations. For example, if computer program 3 (reference 618) has a fingerprint of " . . . S_FRED, S_BAR, S_CORGE, S_QUX, S_FOO . . . " (reference 630), and an output trace shows a sequence of states " . . . S_FRED, S_BAR, S_CORGE, S_BAR_, S_THUD . . . ," an analysis of how computer program 3 (reference 618) may have been compromised may begin with the functions whose expected states are S_CORGE and S_QUX.

The present disclosure provides multiple advantages for code protection against malicious attackers. First, the feat of reverse engineering all elements of a parameter cloud, their interactions, and expected states required by various functions protected by the parameter cloud may be very difficult for a malicious party to accomplish. This may force an attacker to attempt to reverse engineer large sections, if not all, of a binary instead of being able to focus on an individual function as typically done in static analysis. Secondly, tying the execution of a portion of a computer program to the successful completion of all code that precedes that portion of the computer program minimizes an attacker's capacity to circumvent the computer system operation.

Moreover, by randomly generating the expected states of the parameter cloud for a function (e.g., randomly selecting the set of selected elements and randomly assigning values to each member of the selected set) the actual executed code may vary each time an embodiment of the method 500 is applied to the computer program, thus adding another layer of complexity for the attacker to confront. For instance, if an embodiment of method 500 is implemented via a tool or instrument such as 602 of FIG. 6, the tool 602 may operate on the same function multiple times, with a different resulting fingerprint result each time.

The ability to create different parameter clouds and tie them to the same or different functions and/or computer programs adds yet another level of reverse engineering ambiguity that helps to thwart attackers. Also, the ability to fingerprint a computer program provides advantages for identification purposes. For example, a vendor may be able to leverage fingerprinting to individualize computer programs for different customers. Other advantages may also be possible.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed:

1. A method of protecting a computer program with a parameter cloud, comprising:
    creating the parameter cloud, the parameter cloud having a state and a plurality of elements;
    defining an expected state of the parameter cloud for each called function of the computer program, the expected state including a set of selected elements from the plurality of elements of the parameter cloud and an assigned value for each member of the set of selected elements; and
    modifying the computer program, including:
        modifying at least one static portion of the each called function to depend on a current state of the parameter cloud so that during run-time, the each called function executes as indicated by original source code of the each called function when the current state is equivalent to the expected state of the parameter cloud for the each called function and the each called function executes in an unexpected manner when the current state is not equivalent to the expected state of the parameter cloud for the each called function; and
        modifying a calling function to transform the state of the parameter cloud to the expected state of the parameter cloud for the each called function prior to calling the each called function.

2. The method of claim 1, wherein the set of selected elements is arbitrarily selected, and the assigned value for each member of the set of selected elements is arbitrarily assigned.

3. The method of claim 1, further comprising initializing the parameter cloud.

4. The method of claim 1, wherein modifying the computer program comprises at least one of: modifying source code corresponding to the computer program or modifying a post-compiled target of the computer program.

5. The method of claim 4, wherein modifying the post-compiled target of the computer program comprises:
    binding an each target function of the post-compiled target to the state of the parameter cloud, the each target function corresponding to the each called function;
    embedding run-time code within the post-compiled target so that during run-time, a run-time value of the at least one static portion of the each called function is determined based on the current state of the parameter cloud.

6. The method of claim 1, wherein the at least one static portion of the each called function comprises at least one of: constant data, an offset in allocated heap memory, an offset within a loaded image, a compile time value, or a run-time value.

7. The method of claim 1, wherein modifying the at least one static portion of the each called function to depend on the current state of the parameter cloud comprises determining a run-time value of the at least one static portion based upon a current value of at least one of the set of selected elements.

8. The method of claim 1, further comprising omitting at least one of the each called function from having a corresponding expected state of the parameter cloud and from being modified.

9. The method of claim 1, further comprising identifying the computer program using a fingerprint, the fingerprint comprising an expected sequence of states of the parameter cloud corresponding to a sequence of functions executed by the computer program.

10. One or more computer-readable storage devices storing computer-executable instructions which, when executed on a computing system comprising at least a processor executing instructions retrieved from the one or more storage media, carry out a method comprising:
creating a parameter cloud, the parameter cloud having a state and a plurality of elements;
defining an expected state of the parameter cloud for a called function of a computer program, the expected state including a set of randomly selected elements from the plurality of elements and a randomly assigned value for each member of the set of randomly selected elements; and
modifying the computer program, including:
modifying a called function of the computer program, including modifying a static portion of the called function to be derived from a current state of the parameter cloud so that during run-time, the called function executes as indicated by original source code of the called function if the current state of the parameter cloud is the expected state of the parameter cloud for the called function and the called function executes in an unexpected manner if the current state of the parameter cloud is not equivalent to the expected state of the parameter cloud for the called function, and
modifying a calling function of the computer program to transform the state of the parameter cloud to the expected state of the parameter cloud for the called function prior to calling the called function.

11. The one or more computer-readable storage devices of claim 10, wherein modifying the computer program comprises at least one of: modifying source code of the computer program or modifying a post-compiled target binary of the computer program.

12. The one or more computer-readable storage devices of claim 11, wherein modifying the post-compiled target binary of the computer program comprises:
binding a called target function of the post-compiled target binary to the current state of the parameter cloud, the called target function corresponding to the called function, and
embedding run-time code within the post-compiled target binary so that during run-time: the calling function transforms the state of the parameter cloud to the expected state of the parameter cloud for the called function, and the called function derives the static portion of the called function from the current state of the parameter cloud.

13. The one or more computer-readable storage devices of claim 10, further comprising using the parameter cloud for functions executed by a thread, the thread initializing the parameter cloud.

14. The one or more computer-readable storage devices of claim 10, wherein the static portion of the called function comprises at least one of constant data, an offset in allocated heap memory, an offset within a loaded image, a compile time value, or a run-time value.

15. The one or more computer-readable storage devices of claim 10, further comprising defining the expected state of the parameter cloud for every called function of the computer program, and modifying every called and every calling function of the computer program.

16. A method of protecting a computer program from static analysis and from execution of the computer program outside an original intent of the computer program's author, comprising:
creating a parameter cloud having a state and a plurality of elements;
modifying original source code of the computer program so that each called function of the modified source code requires an expected state of the parameter cloud in order to execute as indicated by the original source code and if a current state of the parameter cloud is not equivalent to the expected state of the parameter cloud for the each called function, the each called function executes in an unexpected manner,
the original source code corresponding to the original intent of the computer program's author, and
the expected state comprising a set of arbitrarily selected elements from the plurality of elements of the parameter cloud and an arbitrarily assigned value for each member of the set of arbitrarily selected elements;
wherein modifying the original source code comprises:
modifying a static portion of the each called function so that a current value of the static portion of the each called function is determined based on a current value of at least one element of the plurality of elements based on the current state of the parameter cloud, and
modifying each calling function that calls each called function to transform the current state of the parameter cloud into the expected state prior to calling the each called function.

17. The method of claim 16, wherein the static portion of the each called function is at least one of: constant data, an offset in allocated heap memory, an offsets within a loaded image, a compile time value or a run-time value.

18. The method of claim 16, further comprising initializing a zero state of the parameter cloud by a thread that uses at least one called or calling function of the computer program, the zero state comprising at least one of: predetermined static data, an indication of an allocated value, an indication of a value within a run-time image of the computer program, compile-time data or run-time data.

19. The method of claim 16, further comprising identifying the computer program using a fingerprint, the fingerprint comprising an expected sequence of states of the parameter cloud corresponding to a sequence of functions executed by the computer program.

* * * * *